(12) United States Patent
Brook et al.

(10) Patent No.: US 11,998,163 B2
(45) Date of Patent: Jun. 4, 2024

(54) VACUUM CLEANER

(71) Applicant: Dyson Technology Limited, Wiltshire (GB)

(72) Inventors: Daniel James Brook, Bristol (GB); Steven Hunter, Swindon (GB); Andrew Peter Sinclair, Swindon (GB); Stefan Keir, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 277 days.

(21) Appl. No.: 17/440,215

(22) PCT Filed: Mar. 19, 2020

(86) PCT No.: PCT/GB2020/050732
§ 371 (c)(1),
(2) Date: Sep. 17, 2021

(87) PCT Pub. No.: WO2020/188286
PCT Pub. Date: Sep. 24, 2020

(65) Prior Publication Data
US 2022/0142432 A1    May 12, 2022

(30) Foreign Application Priority Data
Mar. 20, 2019    (GB) .................................... 1903836

(51) Int. Cl.
*A47L 9/28*    (2006.01)
*A47L 5/22*    (2006.01)
(Continued)

(52) U.S. Cl.
CPC ............. *A47L 9/2884* (2013.01); *A47L 5/225* (2013.01); *A47L 5/24* (2013.01); *A47L 9/2842* (2013.01);
(Continued)

(58) Field of Classification Search
None
See application file for complete search history.

(56) References Cited

U.S. PATENT DOCUMENTS

| | | |
|---|---|---|
| 2005/0055795 A1 | 3/2005 | Zeiler et al. |
| 2014/0013540 A1 | 1/2014 | Erko et al. |

(Continued)

FOREIGN PATENT DOCUMENTS

| | | |
|---|---|---|
| CN | 105476542 A | 4/2016 |
| CN | 108427267 A | 8/2018 |

(Continued)

OTHER PUBLICATIONS

Office Action received for Korean Patent Application No. 10-2021-7033832, dated Mar. 30, 2023, 10 pages (5 pages of English Translation and 5 pages of Original Document).

(Continued)

*Primary Examiner* — Jared Fureman
*Assistant Examiner* — Aqeel H Bukhari
(74) *Attorney, Agent, or Firm* — Tucker Ellis LLP

(57) ABSTRACT

A vacuum cleaner includes a vacuum motor configured to draw air through the vacuum cleaner; a battery configured to supply electricity to the vacuum motor; and a control system configured to control the supply of electricity from the battery to the vacuum motor. The control system is configured to switch the vacuum cleaner between a first power mode in which electricity is delivered from the battery to the vacuum motor at a first power level, and at least a second power mode in which electricity is delivered from the battery to the vacuum motor at a second power level which is lower than the first power level. The control system is configured to monitor the extent of operation of the vacuum (Continued)

cleaner in the different power modes, and to provide an alert if usage of the vacuum cleaner in the first power mode exceeds a threshold.

13 Claims, 5 Drawing Sheets

(51) Int. Cl.
A47L 5/24 (2006.01)
H02J 7/00 (2006.01)

(52) U.S. Cl.
CPC ........ *A47L 9/2857* (2013.01); *H02J 7/00306* (2020.01); *H02J 7/0044* (2013.01); *H02J 7/0047* (2013.01)

(56) References Cited

U.S. PATENT DOCUMENTS

| | | | |
|---|---|---|---|
| 2016/0088992 A1 | 3/2016 | Lee et al. | |
| 2016/0095488 A1 | 4/2016 | Lee et al. | |
| 2019/0099051 A1* | 4/2019 | Hird | A47L 9/2852 |
| 2021/0007569 A1* | 1/2021 | Howard | A47L 9/0477 |
| 2022/0233041 A1* | 7/2022 | Conrad | B04C 5/26 |

FOREIGN PATENT DOCUMENTS

| | | |
|---|---|---|
| CN | 109032899 A | 12/2018 |
| GB | 2490285 | 10/2012 |
| JP | 62-298329 A | 12/1987 |
| JP | 2000-308269 A | 11/2000 |
| JP | 2015-009109 A | 1/2015 |
| JP | 2015-521945 A | 8/2015 |
| JP | 2018-191385 A | 11/2018 |
| JP | 2019-000442 A | 1/2019 |
| WO | 2014/011221 A1 | 1/2014 |
| WO | 2018/152843 A1 | 8/2018 |

OTHER PUBLICATIONS

Office Action received for Chinese Patent Application No. 202080017846.X, dated Feb. 25, 2022, 16 pages (9 pages of English Translation and 7 pages of Original Document).

Office Action received for Japanese Patent Application No. 2021-556617, dated Nov. 15, 2022, 8 pages (4 pages of English Translation and 4 pages of Original Document).

International Search Report and Written Opinion received for PCT Patent Application No. PCT/GB2020/050732, dated Jun. 18, 2020, 10 pages.

Search Report received for GB Application No. 1903836.3, dated Sep. 18, 2019, 1 page.

* cited by examiner

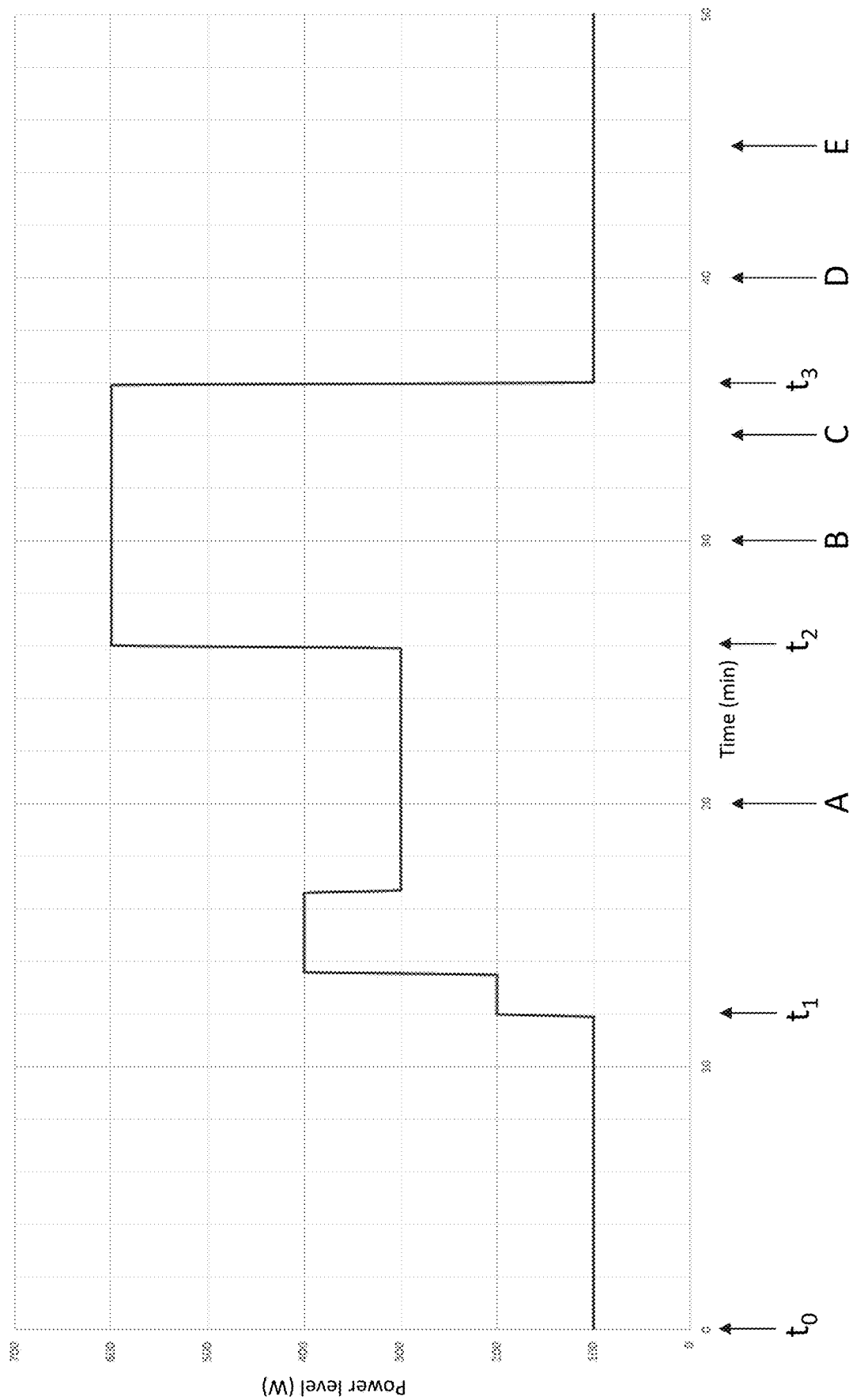

VACUUM CLEANER

CROSS REFERENCE TO RELATED APPLICATIONS

This application is a National Stage application of International Application No. PCT/GB2020/050732 filed Mar. 19, 2020, which claims benefit United Kingdom Patent Application No. 1903836.3 filed Mar. 20, 2019, both of which are herein incorporated by reference in their entirety.

TECHNICAL FIELD AND BACKGROUND

The present invention relates to a vacuum cleaner.

Battery-powered vacuum cleaners often have two or more power modes, allowing an operator to choose how they wish to balance suction power versus battery run time. For instance, some vacuum cleaners have a high power mode which provides relatively high suction power at the expense of reduced battery run-time (due to electricity being supplied from the battery to the suction motor at a relatively high power level), and a low power mode which provides lower suction power but improved battery life. However, running a vacuum cleaner with high power draw from the battery can speed the degradation of the battery over time, steadily reducing the amount of charge which can be held by the battery.

Some vacuum cleaner owners use their vacuum cleaner predominantly or entirely in a high power mode because they are willing to accept a shorter run-time, and are unaware that this can damage the battery of their vacuum cleaner.

Instead or as well, some vacuum cleaner owners tend to use their vacuum cleaner in high power mode, either accidentally (for instance if they have not read the products instruction manual and do not know how to change mode) or deliberately (for instance having not stopped to consider whether high suction power is actually necessary), and become frustrated by the frequency with which they must charge the battery of their vacuum cleaner.

It is one object of the present invention to mitigate or obviate at least one of the above disadvantages, and/or to provide an improved or alternative vacuum cleaner.

SUMMARY

According to the present invention there is provided a vacuum cleaner comprising:
  a vacuum motor configured to draw air through the vacuum cleaner;
  a battery configured to supply electricity to the vacuum motor; and
  a control system configured to control the supply of electricity from the battery to the vacuum motor,
wherein:
  the control system is configured to switch the vacuum cleaner between a first power mode in which electricity is delivered from the battery to the vacuum motor at a first power level, and at least a second power mode in which electricity is delivered from the battery to the vacuum motor at a second power level which is lower than the first power level; and
  the control system is configured to monitor the extent of operation of the vacuum cleaner in the different power modes, and to provide an alert if usage of the vacuum cleaner in the first power mode exceeds a threshold.

By providing the alert if the extent of use of the vacuum cleaner in the first power mode is above the threshold, the vacuum cleaner can warn the user that they may be over-using the first power mode.

The control system may be configured to switch the vacuum cleaner between the first power mode, the second power mode, and a third power mode in which electricity is delivered from the battery to the vacuum motor at a third power level which is lower than the first and second power levels.

The first, second and/or third power level may be a constant value, or may be a value which can vary over time (for instance according to the type of tool attached to the vacuum cleaner, the surface being cleaned or the amount of charge remaining in the battery). In some embodiments, the first and third power levels may be substantially constant and the second power level may vary with time (but vary between values larger than the third power level but smaller than the first power level).

The control system may be configured to provide the alert if the duration of use of the vacuum cleaner in the first power mode exceeds a threshold.

The threshold may be a threshold duration, for instance measured in seconds or minutes, or a threshold based on duration (for instance duration of use in the first power mode as a proportion of overall use).

As an alternative, the control system may be configures to provide the alert based on a different criteria (for instance how many times in a given time window the vacuum cleaner has been turned on while in the first power mode, or how many times the vacuum cleaner has been turned on while in the first power mode as a proportion of the total number of times the vacuum cleaner has been turned on).

The control system may be configured to provide the alert if an amount of time during which electricity has been delivered to the vacuum motor at the first power level, as a percentage of a total time during which electricity has been delivered to the vacuum motor at any power level, exceeds a percentage threshold.

This threshold can provide a particularly good indication as to whether or not an operator is over-using the first power mode.

As an alternative, the control system may be configured to provide the alert if the amount of time during which electricity has been delivered to the vacuum motor at the first power level, as a proportion of a total time since the vacuum cleaner was un-plugged from a charger, exceeds a threshold value.

The threshold percentage may be at least 20%, for instance at least 30% or at least 40%.

This may make the threshold sufficiently high to allow the operator reasonable use of the first power mode, without their being unduly bothered by alerts.

The threshold percentage may be no more than 80%, for instance no more than 70% or no more than 60%.

This may make the threshold sufficiently low to allow the vacuum cleaner to warn an operator when they are over-using the first power mode even to a relatively small extend, rather than only warning them if the first power-mode is being used almost exclusively.

The control system may be configured to calculate said percentage as a rolling figure based on a continually-updated record of usage, said record of usage being a log of which power mode electricity was delivered to the motor in, over a predetermined period of time during which electricity was being delivered to the vacuum motor.

In other words, the percentage may be calculated as a moving figure based on a period of time, akin to calculating a moving average based on preceding data points.

Where the vacuum cleaner has more than two power levels, the record of usage may not necessarily record precisely which power level was delivered to the vacuum motor throughout the predetermined period of time. For example, the record of usage may simply record that power was delivered to the vacuum motor at the first power level or at a different power level.

The predetermined period of time may be at least 1 minute, for instance at least 5 minutes or at least 10 minutes.

This may allow data to be collected over a sufficiently long time for it response of the vacuum cleaner (i.e. whether or not the alert is provided) to be 'smoothed', rather than constantly changing based on the immediate past (which may be an unusual situation).

The predetermined period of time may be no more than 60 minutes, for instance no more than 30 minutes or no more than 20 minutes.

This may allow the vacuum cleaner to be relatively responsive in alerting an operator when the first power mode is being over-used. In contrast, if the predetermined time was too long then the operator may only be alerted to periods of over-use of the first power mode a significant time after the fact, and/or relatively short but significant periods of over-use may go un-reported altogether.

The control system may be configured to provide the alert only when electricity is not being delivered to the vacuum motor.

This may reduce the risk of the alert bothering an operator while they are vacuuming a surface with the vacuum cleaner, and/or may make the alert more obvious by providing it when the operator is not distracted by the act of vacuum cleaning a surface.

The control system may be configured to provide the alert only when the control system is in the first power mode.

This may be beneficial in that it would avoid the possibility of the user being alerted that they are over-using the first power mode when they have already noticed and have switched to another power mode.

The control system may be configured to provide the alert continuously while a certain set of conditions is satisfied.

For example, the alert may be provided at all times as long as the usage of the vacuum cleaner in the first power mode exceeds the threshold in question. As another example, the alert may continue to be provided as long as usage in the first mode exceeds the threshold, and as long as the vacuum cleaner remains in the first power mode and/or electricity is not being delivered to the vacuum cleaner).

This may make the alert more likely to be noticed by an operator, in contrast to an embodiment where the alert was provided at one discrete point in time.

The alert provided by the control system may take the form of a visual indication.

Such an alert may be advantageously unobtrusive (for instance in contrast to an audible alert such as a pulsing of the vacuum motor, which may annoy an operator or someone else nearby).

The visual indication may be displayed on a screen.

Such an indication may be particularly easily understood by an operator.

As an alterative, the visual indication may take another form such as the illumination, flashing or change in colour of one or more lights.

The visual indication may be animated.

For instance, the visual indication may include a scrolling message and/or a video animation.

Movement within the on-screen visual indication may be advantageously attention-grabbing.

BRIEF DESCRIPTION OF THE FIGURES

Embodiments of the present invention will now be described, by way of example only, with reference to the accompanying drawings in which:

FIG. 5 is a graph of electrical power level delivered to a vacuum motor of the handheld vacuum cleaner across a period of time.

DETAILED DESCRIPTION

Figure 1:
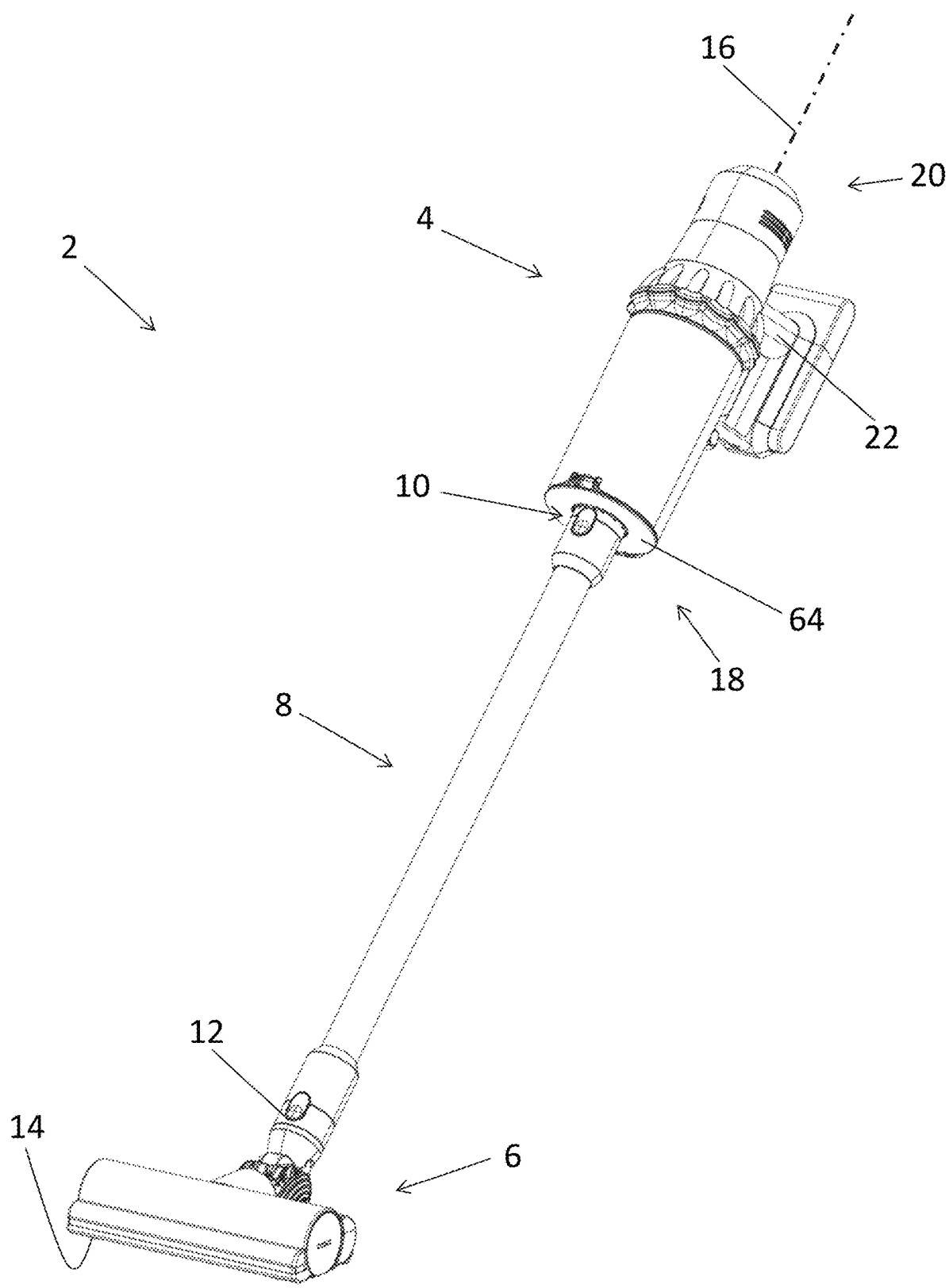
FIG. 1 is a perspective view of a stick vacuum cleaner according to an embodiment of the present invention.

Throughout the description and drawings, corresponding reference numerals denote corresponding features.

FIG. 1 shows a stick vacuum cleaner 2 according to an embodiment of the invention. The stick vacuum cleaner 2 comprises a handheld vacuum cleaner 4 which is connected to a floor tool 6 in the form of a cleaner head by an elongate rigid wand 8. In this case the wand is attachable to an air inlet 10 of the handheld vacuum cleaner, and to a rear duct 12 of the cleaner head 6. The wand 8 is generally tubular, the space inside forming a suction path which extends from the cleaner head 6 to the air inlet 10 of the handheld vacuum cleaner 4.

The cleaner head 6 has a sole plate 14 which is configured to engage a floor surface, and which has a suction opening (not visible) through which dirty air (i.e. air with entrained dirt) from the floor surface can be sucked into the cleaner head 6. In use, a vacuum motor (not visible) housed in the handheld vacuum cleaner 4 generates suction at the air inlet 10. Dirty air from a floor surface is drawn into the cleaner head 6 through the suction opening (not visible) in the sole plate 14, then runs along the inside of the wand 8 and into the air inlet 10 of the handheld vacuum cleaner.

The wand 8 is releasably attachable to the handheld vacuum cleaner 4, so that the handheld vacuum cleaner can be used on its own (or with a tool attached to the air inlet 10). The wand 8 is also releasably attachable to the cleaner head 6, so that different floor tools can be fitted to the wand. Furthermore, the rear duct 12 of the cleaner head 6 can be attached directly to the air inlet 10 of the handheld vacuum cleaner so that the cleaner head 6 can be used in conjunction with the handheld vacuum cleaner 4 rather than being limited to use as part of the stick vacuum cleaner 2.

The handheld vacuum cleaner 4 defines a longitudinal axis 16 which runs from a front end 18 of the handheld vacuum cleaner to a rear end 20. The longitudinal axis 16 intersects the air inlet 10. When it is attached to the handheld vacuum cleaner 4, the wand 8 is parallel to (and in this case collinear with) the longitudinal axis 16. The handheld vacuum cleaner further comprises a pistol grip 22 which is positioned transverse to the longitudinal axis 16. The pistol grip 22 is positioned rearward of the air inlet 10, i.e. the axial position of the pistol grip is further towards the rear end 20 than the air inlet. In other words, the air inlet 10 is positioned forward of the pistol grip 22 (in that the axial position of the air inlet is further towards the front end 18 than the pistol grip).

Figure 2:
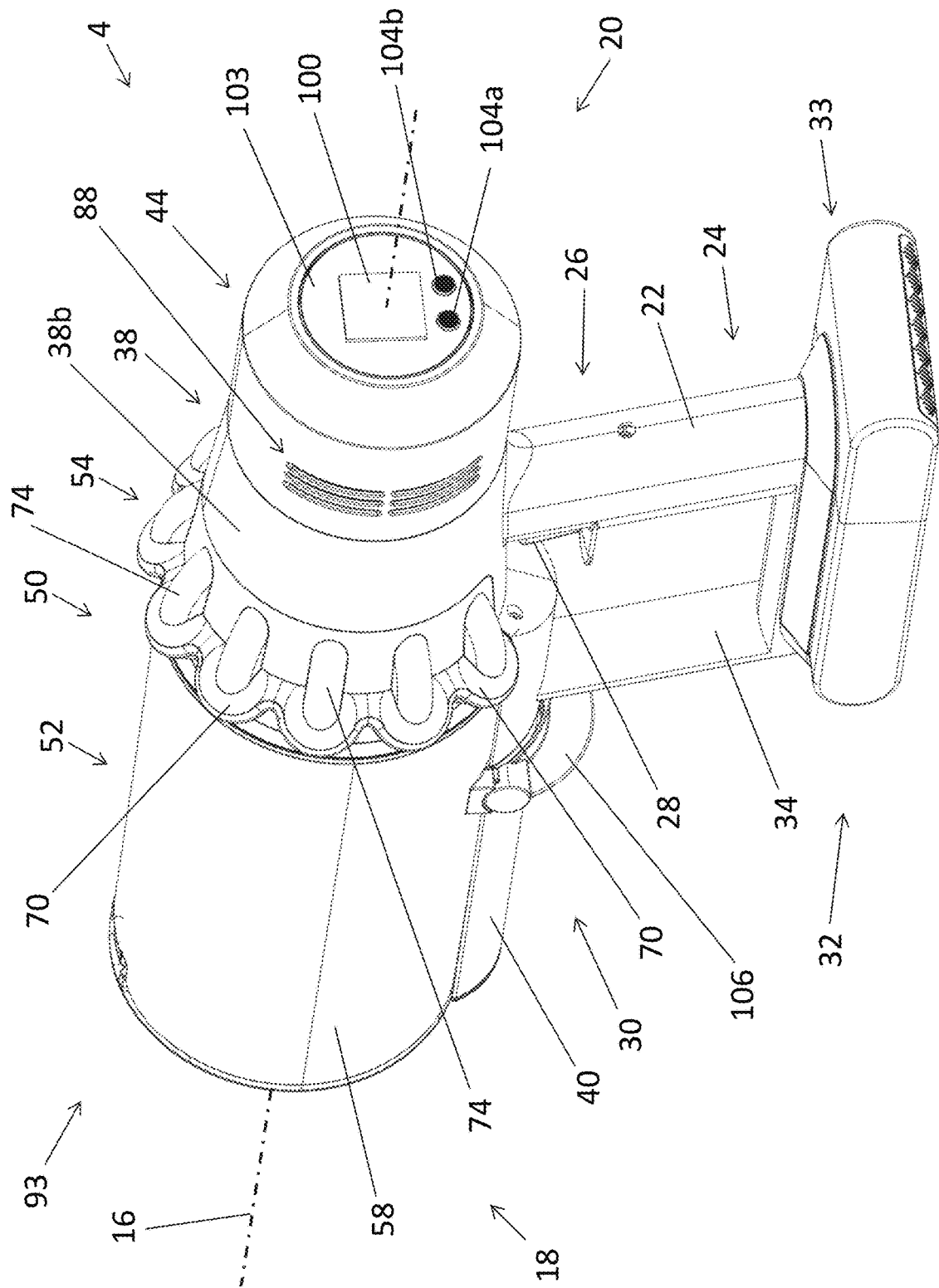
FIG. 2 is a perspective view of a handheld vacuum cleaner of the stick vacuum cleaner of FIG. 1.
Figure 3:
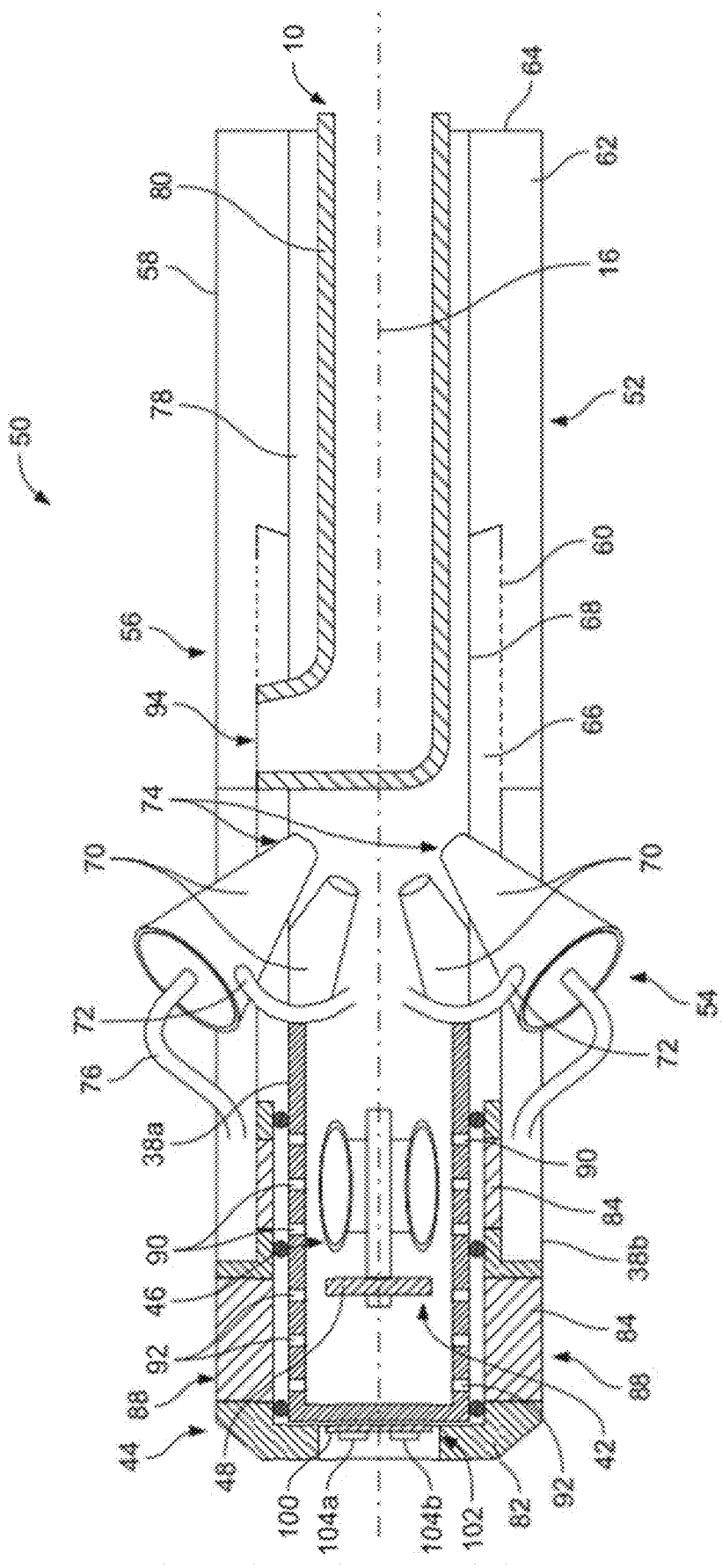
FIG. 3 is a schematic cross-sectional view through the handheld vacuum cleaner of FIG. 2.

FIGS. 2 and 3 show the handheld vacuum cleaner 4 in isolation. The handheld vacuum cleaner 4 will now be described further with reference to these figures in conjunction with FIG. 1.

As noted above, the pistol grip 22 is positioned transverse to the longitudinal axis 16. In this case, the pistol grip 22 is positioned at an angle of around 75 degrees to the longitudinal axis 16. As shown in FIGS. 1-3, with the handheld vacuum cleaner 4 positioned with the longitudinal axis 16 horizontal, the pistol grip 22 can positioned in a generally vertical orientation, running from a lower end 24 to an upper end 26. The upper end 26 has a trigger 28 which forms the on/off switch for the handheld vacuum cleaner 4, as described in more detail later.

The handheld vacuum 4 cleaner comprises a first housing 30 positioned at the upper end 26 of the pistol grip 22, and a second housing 32 positioned at the lower end 24 of the pistol grip 22. The first and second housings 30, 32 are attached to one another by the pistol grip 22, and by a support strut 34 which in this case runs generally parallel to the pistol grip 22.

The handheld vacuum cleaner 4 is battery powered. An array of cells (not visible) and a battery management system (BMS) on a circuit board (not visible) are provided in the second housing 32. The cells, BMS and second housing 32 form a battery pack 33. In some embodiments the battery pack 33 may be removable, but in this case it is permanently attached. In this embodiment the batteries are rechargeable. They can be charged in situ by plugging a charging cable into a charging port (not shown) of the handheld vacuum cleaner 4.

The first housing 30 comprises a motor housing 38 and a separator support 40. The motor housing 38 is generally elongate and defines a longitudinal axis which is collinear with the longitudinal axis 16. The motor housing 38 houses a vacuum motor 42 and supports a filter assembly 44. The vacuum motor 42 comprises an electric motor 46 and an impeller 48. The electric motor 46 is configured to receive power from the batteries (not visible) so as to drive the impeller 48 to rotate about a motor axis which in this case is collinear with the longitudinal axis 16. Rotation of the impeller 48 creates a flow of air through the handheld vacuum cleaner 4 (as discussed in more detail below) and thereby generates suction at the air inlet 10.

The separator support 40 supports a dirt separator 50 which is configured to remove dirt from the air that is drawn into the handheld vacuum cleaner 4 through the air inlet 10. The dirt separator 50 of this embodiment comprises a first separation stage 52 and a second separation stage 54. The first separation stage 52 has a single cyclone chamber 56 formed by an upper portion of a transparent bin 58, a porous cylindrical shroud 60, and a first dirt receptacle 62 which is formed by a lower portion of the bin 58 and an openable lid 64 which is pivotable about a hinge (not visible). The bin 58 takes the form of a cylindrical outer wall which is concentrically positioned around the longitudinal axis 16. With the bin 58 being concentrically positioned, the rotational axis of the first separation stage 52 (i.e. the rotational axis of the cyclone which forms inside the cyclone chamber 56) is collinear with the longitudinal axis.

Behind the shroud 60 is an air passage 66 which surrounds an inner wall 68 and leads to the second separation stage 54. The second separation stage 54 has a plurality of cyclone chambers 70 arranged in parallel. The cyclone chambers 70 have respective tangential inlets 72 which branch off from the air passage 66, open ends 74 configured as dirt outlets, and air outlets in the form of vortex finders 76. The second separation stage 54 also has a second dirt receptacle 78 which is defined between the inner wall 68 and a duct 80 of the air inlet 10. The duct 80 is generally elongate, defining an inlet axis which is parallel to, and in this case collinear with, the longitudinal axis 16.

The filter assembly 44 comprises a casing 82, a pre-motor filter member 84 and a post-motor filter member 86. The casing 82 defines a pair of grid-like air outlets 88 through which clean air (i.e. air from which at least some of the entrained dirt had been separated therefrom) is exhausted from the handheld vacuum cleaner 4. The pre-motor filter member 84 is positioned upstream of the vacuum motor 42 and downstream of the dirt separator 50, and is configured to filter out small dirt particles which were not removed by the dirt separator 50 before they can reach the vacuum motor 42. The pre-motor filter member 84 comprises a layered wad of porous felt which in this case including a layer of an electrostatic felt such as is sold under the name Technostaf. The post-motor filter member 86 is positioned downstream of the vacuum motor 42 and upstream of the air outlets 88. The post-motor filter member 86 is configured to filter any dirt particles which may be released by the electric motor 46 (for instance debris from carbon brushes of the electric motor 46). In this case the post-motor filter member 86 is a pleated glass fibre HEPA filter. The filter members 84, 86 are annular in shape and share a common axis, which in this embodiment is collinear with the longitudinal axis 16. Indeed, the entire filter assembly 44 is annular, and is positioned substantially concentrically around the longitudinal axis 16.

The handheld vacuum cleaner 4 comprises a screen 100, more particularly a planar, full colour, backlit TFT screen mounted on a rear face of the motor bucket 38a, which faces rearwards. On the reverse of the screen is a controller 101 in the form of a PCB, which will be discussed in more detail later.

The screen 100 faces substantially exactly rearwards (i.e. is substantially normal to the longitudinal axis). It is positioned on the first housing 30 (more particularly on the motor bucket 38a, behind the vacuum motor 42), and is therefore situated radially above the pistol grip 22 for ease of visibility. As well as being above it, the screen 100 lies axially behind the pistol grip 22. Indeed, the screen 100 is positioned on a rearmost surface 103 of the handheld vacuum cleaner so that it cannot be obscured by components of the handheld vacuum cleaner positioned behind it. The screen 100 is located such that it is intersected by the longitudinal axis 16.

The screen 100 is visible through an aperture 102 in the filter assembly 44 which takes the form of a circular through-hole in the casing 82 of the filter assembly 44. In this case the screen 100 is recessed slightly with respect to the casing 82 such that the screen is viewed by looking through the aperture 102. In other cases, however, the core 38 of the motor housing 30 may extend slightly further rearwards such that the screen 100 projects through the aperture 102 and stands proud of the casing 82.

Positioned beneath the screen 100 (in the vertical direction defined by the pistol grip 22) are a pair of control members 104a, 104b, each of which is positioned adjacent to the screen 100 and is configured to receive a control input from the user. In this case each control member 104a, 104b takes the form of a push-button. Like the screen 100, each control member 104a, 104b faces rearwards. The control members 104a, 104b are pressed by pushing them forwards in a direction parallel to the longitudinal axis 16. In this embodiment, the buttons 104a, 104b are used to change the suction power level of the vacuum cleaner 4.

To use the stick vacuum cleaner 2, the user grips the handheld vacuum cleaner 4 by the pistol grip 22, with their index finger and middle finger gripping the upper end 26 and their ring finger and little finger gripping the lower end 24. This positions the longitudinal axis 16 substantially in line with the user's forearm when their wrist is straight. The user can then point longitudinal axis 16 of the handheld vacuum cleaner 4 towards an area of floor to be cleaned (by moving their forearm and/or wrist), thereby pointing the air inlet 10, wand 8 and cleaner head 6 towards that area.

In use, electricity from the batteries is delivered to the electric motor 46 of the vacuum motor by wires (not visible), as discussed in more detail below, and the electric motor 46 rotates the impeller 48. The impeller 48 creates a flow of air through the vacuum cleaner, drawing air into the air inlet 10 and exhausting it out of the air outlets 88. This creates suction at the air inlet 10 which draws an air flow into the stick vacuum cleaner 2. The air flow runs through an air flow passage that extends from the suction opening (not visible) of the sole plate 14 to the air outlets 88 of the filter assembly 44, through the cleaner head 6, wand 8 and handheld vacuum cleaner 4.

Dirty air which has entered the air inlet 10 from the cleaner head 6 via the wand 8 passes along the duct 80, an end section 94 of which turns the air flow radially outwards and then directs it to enter the cyclone chamber 56 of the first separation stage 52 tangentially. The air then spirals around the cyclone chamber 56, where coarse dirt is separated therefrom by centrifugal action and is deposited into the first dirt receptacle 62. Air from which coarse dirt has been separated then passes through the shroud 60, through the air passage 66 and into the second separation stage 54. The air then splits into a series of streams, each of which enters one of the cyclone chambers 70 through its inlet 72 and forms a cyclone therein. Finer dirt is separated by centrifugal action and ejected out of the open end 74 of the cyclone chamber 70 into the second dirt receptacle 78, while air from which the finer dirt has been removed exits the cyclone chamber 70 through its vortex finder 76. From the vortex finders 76, the separate streams are then directed into the filter assembly 44. The air is then directed generally radially inwards, through the pre-motor filter member 84, through the apertures 90 and into the electric motor 46. It then passes out axially of the electric motor 46, through the impeller 48, through the apertures 92 and through the post-motor filter member 86. The clean air then runs out of the handheld vacuum cleaner 4 through the air outlets 88.

Figure 4:
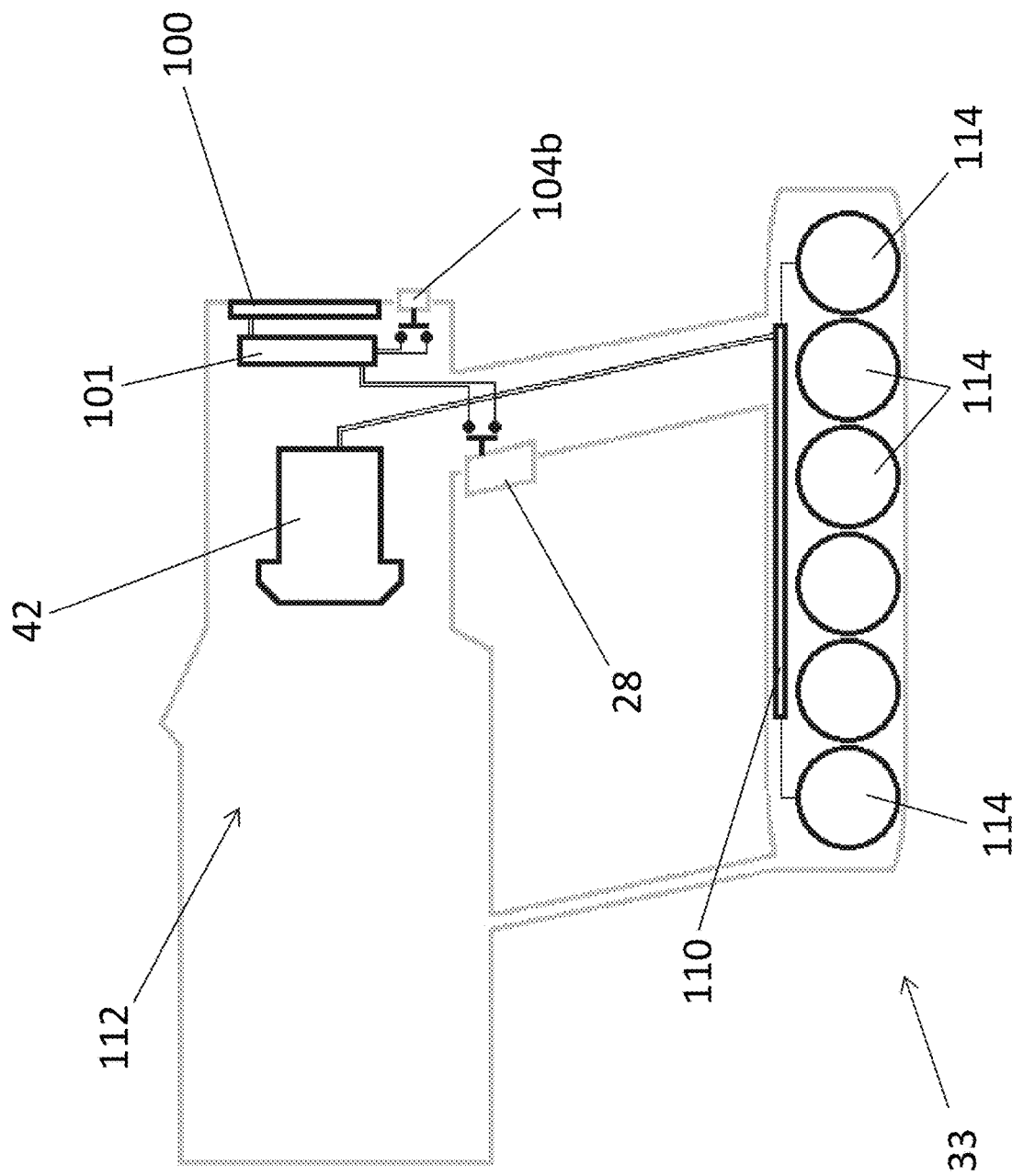
FIG. 4 is a schematic of a control system of the vacuum cleaner.

Referring now to FIG. 4 in combination with FIGS. 1-3, the trigger 28, BMS 110, screen 100, controller 101 and control members 104a, 104b are linked together by wiring and together form a control system 112 of the vacuum cleaner 4.

The control system 112 controls the supply of electricity from the batteries (not visible) to the vacuum motor 42. In this embodiment, the control system 112 controls the timing of when electricity is delivered to the vacuum motor 42, as well as the power level at which electricity is delivered, as outlined below.

The controller 101 is wired to the trigger 28 and to the BMS 110, and the BMS is wired to the cells 114 and the vacuum motor 42. When the trigger 28 is pulled by an operator, the controller 101 senses this and signals the BMS 110. The BMS 110 then allows electricity to flow from the batteries to the vacuum motor 42 at a particular power level, whereupon the electric motor 46 rotates the impeller to draw air through the vacuum cleaner 4 at a particular suction power.

The vacuum cleaner 4 has different power modes, in which electricity is delivered to the vacuum motor 42 at different power levels. In this case the vacuum cleaner 4 has three power modes—a first power mode which is a high power mode in which electricity is supplied to the vacuum motor 42 at a power level of 600 W; a second power mode which is a mid power mode in which electricity is supplied to the vacuum motor 42 at a power level of between 200 W and 400 W; and a third power mode which is a low power mode in which electricity is supplied to the vacuum motor at a power level of 100 W. The precise power level at which electricity is delivered to the vacuum motor 42 when the vacuum cleaner 4 is in the second power mode varies with time according to the surface being cleaned by the vacuum cleaner 4, in a manner which is not material to the present invention.

The control system 112 is configured to switch the vacuum cleaner 4 between the three power modes. In this case, an operator can cycle through the three power modes using the control members 104a, 104b, which are wired to the controller 101. When the operator presses one of the control members 104a, 104b, the controller 101 detects this and signals the BMS 110 to change the power level at which electricity will be supplied to the vacuum motor 42 next time the trigger 28 is pulled. More particularly, if the user presses control member 104a then the controller 101 signals the BMS to step down one power mode (unless the vacuum cleaner is already in the low power mode, in which case no action will be taken), and if the user presses control member 104b then the controller 101 signals the BMS 110 to step up one power mode (unless the vacuum cleaner is already in the high power mode, in which case no action will be taken).

The control system 112 monitors the extent of operation of the vacuum cleaner 4 in the different modes, and provides an alert if use of the vacuum cleaner in the first power mode (the high power mode) exceeds a threshold. In this case, the control system 112 provides the alert if the duration of use of the vacuum cleaner 4 in the first mode exceeds a threshold.

More particularly, it calculates the time over which electricity has been delivered to the vacuum motor 42 at the first power level, as a proportion of the total time over which electricity has been delivered to the vacuum motor in any mode, and provides an alert if this proportion exceeds a 50% threshold.

In this embodiment, the control system 112 calculates this proportion as a rolling figure, based on a continually-updated record of usage. This record of usage is a log of which power mode electricity was delivered to the vacuum motor 42 in, over a predetermined period of time over which power was delivered to the vacuum motor at any power level. More specifically, the control system 112 keeps a log of the last 16 minutes of time in which electricity was delivered to the vacuum motor, and calculates what proportion of this 16 minutes was spent with electricity being delivered to the vacuum motor at the first power level. This may be better understood with reference to FIG. 5, which is an example graph of power level delivered to the vacuum motor against time during which electricity is delivered to the vacuum motor 42. It is important to note that this graph displays power level against time during which electricity is delivered to the vacuum motor, not against absolute time. At one or more points along the graph the operator may have discontinued vacuum cleaning, for instance to carry the vacuum cleaner 4 between rooms or to charge the vacuum cleaner. Indeed, although the total time shown in FIG. 5 is less than an hour, this amount of usage may have accumulated over several days or weeks.

Between $t_0$ and $t_1$, electricity was delivered to the vacuum motor 42 at a power level of 100 W. Accordingly, the vacuum cleaner 4 must have been used in the third power mode. Between $t_1$ and $t_2$, electricity was delivered to the vacuum motor 42 at a power level varying between 200 W and 400 W, therefore for this time the vacuum cleaner 4 must have been used in the second power mode. Between $t_2$ and $t_3$, electricity was delivered to the vacuum motor 42 at a power level of 600 W, meaning that the vacuum cleaner 4 was in the high power mode during this time. From $t_3$ onwards, electricity was delivered to the vacuum motor 42 at a power level of 100 W, therefore from that point onwards the vacuum cleaner must have been used in the third power mode again.

At point A (t=20) on the graph of FIG. 5, if the control system 112 were to calculate the proportion of the predetermined period (in this case the last 16 minutes of time during which electricity was being delivered to the vacuum motor 42) during which electricity were delivered to the vacuum motor at the first power level (i.e. the high power level—600 W), the record of usage would be a log of the portion of FIG. 5 that lies between t=4 and t=20. In this time window, electricity has only been delivered to the vacuum motor 42 at the low and mid power levels (i.e. the trigger has only been pulled with the vacuum cleaner in the low or mid power modes), therefore the proportion would be 0%.

At point B (t=30) on the graph of FIG. 5, if the control system 112 were to calculate the proportion of the predetermined period during which electricity were delivered to the vacuum motor at the first power level, the record of usage would be a log of the portion of FIG. 5 that lies between t=14 and t=30. In this time window, electricity was delivered to the vacuum motor 42 at the mid power level between t=14 and t=25, and electricity was delivered to the vacuum motor 42 at the high power level between t=25 and t=30. Accordingly, in the predetermined period electricity was delivered to the vacuum motor 24 at the high power level for 5 minutes out of the total of 16 minutes, meaning the proportion would be around 30%.

At point C (t=34) on the FIG. 5, if the control system 112 were to calculate the proportion of the predetermined period during which electricity were delivered to the vacuum motor at the first power level, the record of usage would be a log of the portion of FIG. 5 that lies between t=18 and t=34. In this time window, electricity was delivered to the vacuum motor 42 at the mid power level between t=18 and t=25, and electricity was delivered to the vacuum motor 42 at the high power level between t=25 and t=34. Accordingly, in the predetermined period electricity was delivered to the vacuum motor 24 at the high power level for 9 minutes out of the total of 16 minutes, meaning the proportion would be around 56%. The proportion would therefore be above the 50% threshold, and the control system 112 would provide an alert (as described in more detail later).

At point D (t=40) on FIG. 5, if the control system 112 were to calculate the proportion of the predetermined period during which electricity were delivered to the vacuum motor at the first power level, the record of usage would be a log of the portion of FIG. 5 that lies between t=24 and t=40. In this time window, electricity was delivered to the vacuum motor 42 at the high power level between t=24 and t=37, and electricity was delivered to the vacuum motor 42 at the low power level between t=37 and t=40. Accordingly, in the predetermined period electricity was delivered to the vacuum motor 24 at the high power level for 13 minutes out of the total of 16 minutes, meaning the proportion would be around 81%. The proportion would therefore still be above the 50% threshold, and the control system 112 would continue to provide the alert.

At point E (t=45) on FIG. 5, if the control system 112 were to calculate the proportion of the predetermined period during which electricity were delivered to the vacuum motor at the first power level, the record of usage would be a log of the portion of FIG. 5 that lies between t=29 and t=45. In this time window, electricity was delivered to the vacuum motor 42 at the high power level between t=29 and t=37, and electricity was delivered to the vacuum motor 42 at the low power level between t=37 and t=45. Accordingly, in the predetermined period electricity was delivered to the vacuum motor 24 at the high power level for 8 minutes out of the total of 16 minutes, meaning the proportion would be 50%. Since the proportion is no longer over the 50% threshold, the control system 112 would cease to provide the alert.

In this embodiment, the alert provided by the control system 112 takes the form of a visual indication displayed on the screen 100. More particularly, the screen 100 displays scrolling text which reads "Lower power mode preserves battery health", and animated hearts appear and flash over icons representing the low and mid modes.

In this embodiment, the alert is only provided (i.e. the above text and animation is only displayed on the screen 100) while the vacuum cleaner 4 is in the high power mode. If the operator changes down to a lower mode then the alert will disappear, but if the operator then changes back to high mode then the text and animation reappears. Further, the alert is only provided while no electricity is delivered to the vacuum motor 42. If the operator squeezes the trigger 28, electricity is delivered to the vacuum motor 42 and the alert ceases to be shown on the screen. When the operator releases the trigger, presuming it is still the case that more than 8 minutes of the last 16 minutes of electricity delivered to the vacuum motor 42 were delivered at the high power level then the text and animation will return to the screen 100. Accordingly, the alert is displayed continuously while a certain set of conditions (duration in high mode is over 50%, vacuum cleaner 4 is in high mode and the trigger 28 is not pulled) are satisfied.

It will be appreciated that numerous modifications to the above described embodiments may be made without departing from the scope of invention as defined in the appended claims. For instance, whilst in the above embodiment the mode of the vacuum cleaner 4 switching of the power mode (using control members 104a, 104b) and selective delivery of electricity to the vacuum motor 42 (using the trigger 28) can be performed independently, in other embodiments this may not be the case. For instance, a single button may control both functions (for instance by cycling from off, to low mode, to mid mode, to high mode then to off again with consecutive presses).

For the avoidance of doubt, the optional and/or preferred features described above may be utilised in any suitable combinations, and in particular in the combinations set out in the appended claims.

The invention claimed is:
1. A vacuum cleaner comprising:
  a vacuum motor configured to draw air through the vacuum cleaner;

a battery configured to supply electricity to the vacuum motor; and a control system configured to control the supply of electricity from the battery to the vacuum motor, wherein:

the control system is configured to switch the vacuum cleaner between a first power mode in which electricity is delivered from the battery to the vacuum motor at a first power level, and at least a second power mode in which electricity is delivered from the battery to the vacuum motor at a second power level which is lower than the first power level; and the control system is configured to monitor the duration of operation of the vacuum cleaner in the different power modes, and to provide an alert if the duration of operation of the vacuum cleaner in the first power mode, as a percentage of a total time during which electricity has been delivered to the vacuum motor at any power level, exceeds a percentage threshold.

2. The vacuum cleaner according to claim 1, wherein the control system is configured to switch the vacuum cleaner between the first power mode, the second power mode, and a third power mode in which electricity is delivered from the battery to the vacuum motor at a third power level which is lower than the first and second power levels.

3. The vacuum cleaner according to claim 1, wherein the threshold percentage is at least 30.

4. The vacuum cleaner according to claim 1, wherein the threshold percentage is no more than 70%.

5. The vacuum cleaner according to claim 1, wherein the control system is configured to calculate said percentage as a rolling figure based on a continually-updated record of usage, said record of usage being a log of which power mode electricity was delivered to the motor in, over a predetermined period of time during which electricity was being delivered to the vacuum motor.

6. The vacuum cleaner according to claim 5, wherein the predetermined period is at least 5 minutes.

7. The vacuum cleaner according to claim 5, wherein the predetermined period is no more than 30 minutes.

8. The vacuum cleaner according to claim 1, wherein the control system is configured to provide the alert only when electricity is not being delivered to the vacuum motor.

9. The vacuum cleaner according to claim 1, wherein the control system is configured to provide the alert only when the control system is in the first power mode.

10. The vacuum cleaner according to claim 1, wherein the control system is configured to provide the alert continuously while a certain set of conditions is satisfied.

11. The vacuum cleaner according to claim 1, wherein the alert provided by the control system takes the form of a visual indication.

12. The vacuum cleaner according to claim 11, wherein the visual indication is displayed on a screen.

13. The vacuum cleaner according to claim 12, wherein the visual indication is animated.

* * * * *